Patented Sept. 26, 1950

2,523,433

UNITED STATES PATENT OFFICE 2,523,433

PREPARATION OF TRIALLYL BORATES

Ernest Paul Irany, Cranford, N. J.

No Drawing. Application August 11, 1948,
Serial No. 43,761

3 Claims. (Cl. 260—462)

My invention relates to a process of preparation of the boric acid esters of allyl alcohol and homologs thereof.

It is known as a general method for the preparation of boric acid esters to boil mixtures of boric acid and the respective alcohol in the presence of anhydrous acid catalysts. The catalyst mostly used for this purpose is concentrated sulphuric acid but other acids or salts having an acidic reaction can be employed.

While this method is satisfactory in the case of most saturated alcohols it fails completely if applied to allyl alcohol. Apparently, acid allyl borates are formed initially which are unstable in the presence of the acid catalyst. If sulphuric acid is used the reaction produces large quantities of black, charred resinous matter and only very low yields of triallyl borate. Other strongly acidic catalysts are equally undesirable because of their tendency of entering into or promoting side reactions at the expense of the formation of triallyl borate. Weaker acidic substances are without action.

Triallyl borate has been made from allyl alcohol and boric anhydride (boron trioxide) without addition of a catalyst, by heating to an elevated temperature under pressure. This method, first disclosed by Councler, Journal für Praktische Chemie (2), 18, 376 (1878), is inconvenient not only because of the required operation under pressure in a suitably designed and equipped vessel, but chiefly because of the use of boric anhydride. This material is obtained as an extremely hard, non-brittle glass by heating boric acid to fusion. It must be ground to a fine powder under rigorous exclusion of atmospheric humidity because of its extreme hygroscopicity and its tendency to revert to boric acid. The same precautions must be applied to all handling, storing and charging of boric anhydride in order to assure a reagent of satisfactory activity. The yield of triallyl borate by Councler's method is about 45%.

Triallyl borate thus obtained is a colorless mobile liquid boiling without decomposition under atmospheric pressure at 179° C. Its specific gravity at 0° C. is 0.9241 and its refractive index ($N_D$), 1.4333. It is easily hydrolysed in contact with water or atmospheric humidity. It is miscible with organic solvents of most types. For practical purposes, its most interesting property is its polymerizability, either alone or in combination with other copolymerizable monomers, to form polymers and copolymers of high molecular weight. These products are hydrolyzable by contact with water and are thus converted into polyallyl alcohol and copolymers comprising polyallyl alcohol structural units, respectively. While such products can be obtained by the saponification of other polyallyl esters, they can be prepared much more easily and in purer form from polyallyl borates, provided that triallyl borate can be made available by an economical process.

I now have found that, while no other acid catalyst of a sufficient catalytic activity allows the preparation of triallyl borate directly from allyl alcohol and boric acid in satisfactory yields, sulphamic acid, $HO.SO_2.NH_2$, assures almost quantitative conversion of the components into triallyl borate, under atmospheric pressure and without the formation of resinous by-products or decomposition.

Example I

To 62 parts by weight of boric acid is added a mixture of 260 parts by weight of allyl alcohol and 50 parts by weight of benzene. After addition of 1 part by weight of crystallized sulphamic acid dissolved in a small amount of water the mixture is stirred and heated to refluxing temperature. The vessel is equipped with a reflux condenser which discharges into a water trap. The boric acid gradually dissolves in the reaction mixture and water, carried over by the vapor, is collected in the trap. After six hours its amount is the exact equivalent of the boric acid used and ceases to increase further. Fractionation of the reaction mixture yields a colorless distillate boiling between 124 and 126° C. under pressure of 133 mm. mercury, which is analytically pure triallyl borate in about 90% yield.

Example II

A mixture as in Example I but containing an equal amount of toluene instead of benzene is heated under reflux and the returning condensate is free from water by being by-passed over anhydrous potassium carbonate. A high yield of triallyl borate is obtained after 4 hours.

The above examples being for the purpose of illustration only, it is apparent to those skilled in the art that apparatus and water-removing means other than those described may be employed and that the process may be applicable to the preparation of closely related homologs of tri-allyl borate, such as, for example, trimethallyl borate.

I claim:

1. A process of preparing triallyl borate by heating a mixture comprising allyl alcohol, boric acid and sulphamic acid and removing water from said mixture.

2. A process as claimed in claim 1 wherein the said mixture is heated at its boiling point under atmospheric pressure.

3. A process of preparing triallyl borate by heating a mixture comprising allyl alcohol, boric acid, sulphamic acid and an aromatic hydrocarbon to the boiling point of said mixture, removing water from the condensed vapor and returning said condensate to said mixture.

ERNEST PAUL IRANY.

REFERENCES CITED

The following references are of record in the file of this patent:

UNITED STATES PATENTS

| Number | Name | Date |
|---|---|---|
| 2,249,768 | Kropa | July 22, 1941 |
| 2,276,094 | Rothrock | Mar. 10, 1942 |

OTHER REFERENCES

Scattergood et al.: "Jour. Am. Chem. Soc."; vol. 67, pp. 2150 to 2152.

Thomas: "Jour. Chem. Soc. (London)"; vol. 1946, pp. 820–822.